(12) United States Patent
Choi et al.

(10) Patent No.: US 9,935,802 B2
(45) Date of Patent: Apr. 3, 2018

(54) METHOD FOR TRANSMITTING SIGNAL FIELD AND APPARATUS THEREFOR

(71) Applicant: LG ELECTRONICS INC., Seoul (KR)

(72) Inventors: Jinsoo Choi, Seoul (KR); Wookbong Lee, Seoul (KR); Hangyu Cho, Seoul (KR); Dongguk Lim, Seoul (KR); Jinyoung Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/778,988

(22) PCT Filed: Apr. 18, 2014

(86) PCT No.: PCT/KR2014/003418
§ 371 (c)(1),
(2) Date: Sep. 21, 2015

(87) PCT Pub. No.: WO2014/171788
PCT Pub. Date: Oct. 23, 2014

(65) Prior Publication Data
US 2016/0050093 A1 Feb. 18, 2016

Related U.S. Application Data

(60) Provisional application No. 61/813,644, filed on Apr. 19, 2013, provisional application No. 61/821,732, filed on May 10, 2013.

(51) Int. Cl.
*H04K 1/10* (2006.01)
*H04L 27/28* (2006.01)
(Continued)

(52) U.S. Cl.
CPC ....... *H04L 27/2042* (2013.01); *H04B 7/0452* (2013.01); *H04L 5/0007* (2013.01);
(Continued)

(58) Field of Classification Search
CPC . H04L 27/2042; H04L 5/0023; H04L 5/0007; H04L 27/2613; H04L 27/2602;
(Continued)

(56) References Cited

U.S. PATENT DOCUMENTS

2010/0260159 A1* 10/2010 Zhang ................ H04W 28/06
370/338
2011/0110348 A1* 5/2011 Lee ..................... H04L 27/2613
370/338
(Continued)

FOREIGN PATENT DOCUMENTS

| CN | 102835061 | 12/2012 |
|---|---|---|
| EP | 2706792 | 3/2014 |

(Continued)

OTHER PUBLICATIONS

PCT International Application No. PCT/KR2014/003418, Written Opinion of the International Searching Authority dated Jul. 21, 2014, 1 page.
(Continued)

*Primary Examiner* — Phuong Phu
(74) *Attorney, Agent, or Firm* — Lee Hong Degerman Kang Waimey

(57) ABSTRACT

Disclosed is a method for transmitting a signal field in a wireless LAN along with an apparatus therefore. The method for transmitting a signal field in a wireless LAN includes the steps of: generating a signal field by a first STA (station); and transmitting the signal field to a second STA by the first STA in a first OFDM (orthogonal frequency division multiplexing) symbol, a second OFDM symbol and
(Continued)

a third OFDM symbol, wherein at least one of a second binary phase shift keying used in the second OFDM symbol and a third binary phase shift keying used in the third OFDM symbol can be rotated in reference to the first binary phase shift keying used in the first OFDM symbol.

6 Claims, 15 Drawing Sheets

(51) Int. Cl.
*H04L 27/20* (2006.01)
*H04L 27/26* (2006.01)
*H04L 5/00* (2006.01)
*H04B 7/0452* (2017.01)
*H04W 84/12* (2009.01)
*H04L 27/18* (2006.01)

(52) U.S. Cl.
CPC .......... *H04L 5/0023* (2013.01); *H04L 5/0053* (2013.01); *H04L 27/205* (2013.01); *H04L 27/2602* (2013.01); *H04W 84/12* (2013.01); *H04L 5/0092* (2013.01); *H04L 27/18* (2013.01)

(58) Field of Classification Search
CPC ..... H04L 5/0053; H04L 5/0092; H04L 27/18; H04L 27/205; H04B 7/0452; H04W 84/12; H04W 28/06
USPC ......... 375/260, 346, 279, 280, 308; 370/338
See application file for complete search history.

(56) References Cited

U.S. PATENT DOCUMENTS

2011/0255620 A1  10/2011  Jones et al.
2013/0259017 A1  10/2013  Zhang et al.
2013/0286959 A1  10/2013  Lou et al.

FOREIGN PATENT DOCUMENTS

| JP | 2012523774 | 10/2012 |
| JP | 2015518322 | 6/2015 |
| KR | 10-2011-0070710 | 6/2011 |
| KR | 10-2011-0097682 | 8/2011 |
| KR | 10-2012-0055622 | 5/2012 |
| KR | 10-2013-0010487 | 1/2013 |
| RU | 2355111 | 5/2009 |
| WO | 2010/120692 | 10/2010 |
| WO | 2011130473 | 10/2011 |
| WO | 2012163147 | 12/2012 |

OTHER PUBLICATIONS

IP Australia Application Serial No. 2014254581, Office Action dated Jan. 18, 2016, 3 pages.
Richard van Nee et al., "VHT-SIG-A and VHT-SIG-B Field Structure", IEEE 802.11-10/1052r0, Sep. 2010, 9 pages.
Korean Patent Office Application No. 10-2015-7025407, Office Action dated May 2, 2016, 4 pages.
Japan Patent Office Application No. 2016-504263, Office Action dated Nov. 30, 2016, 5 pages.
Stacey, et al., "Specification Framework for TGac", IEEE 802.11-0910992r21, Jan. 19, 2011, 50 pages.
Russian Federation Federal Service for Intellectual Property, Patents and Trademarks Application Serial No. 2015149306/07(075894), Office Action dated Nov. 25, 2016, 12 pages.
European Patent Office Application Serial No. 14784763.6, Search Report dated Jan. 3, 2017, 8 pages.
Zhang, et al., "802.11ac Preamble", IEEE 802.11-10/0070r3, Mar. 15, 2010, 27 pages.
Stacey, et al., "Specification Framework for TGac", IEEE 802.11-09/0992r18, Sep. 16, 2010, 40 pages.
Tu, et al., "Proposal for TGac VHT Format", IEEE 802.11-09/1258r0, Nov. 19, 2009, 12 pages.
Canadian Intellectual Property Office Patent Application No. 2,908,045, Office Action dated Jun. 7, 2017, 5 pages.
European Patent Office Application Serial No. 14784763.6, Office Action dated Oct. 19, 2017, 5 pages.
The State Intellectual Property Office of the People's Republic of China Application Serial 201480022297.X, Office Action dated Nov. 16, 2017, 6 pages.

\* cited by examiner

FIG. 1
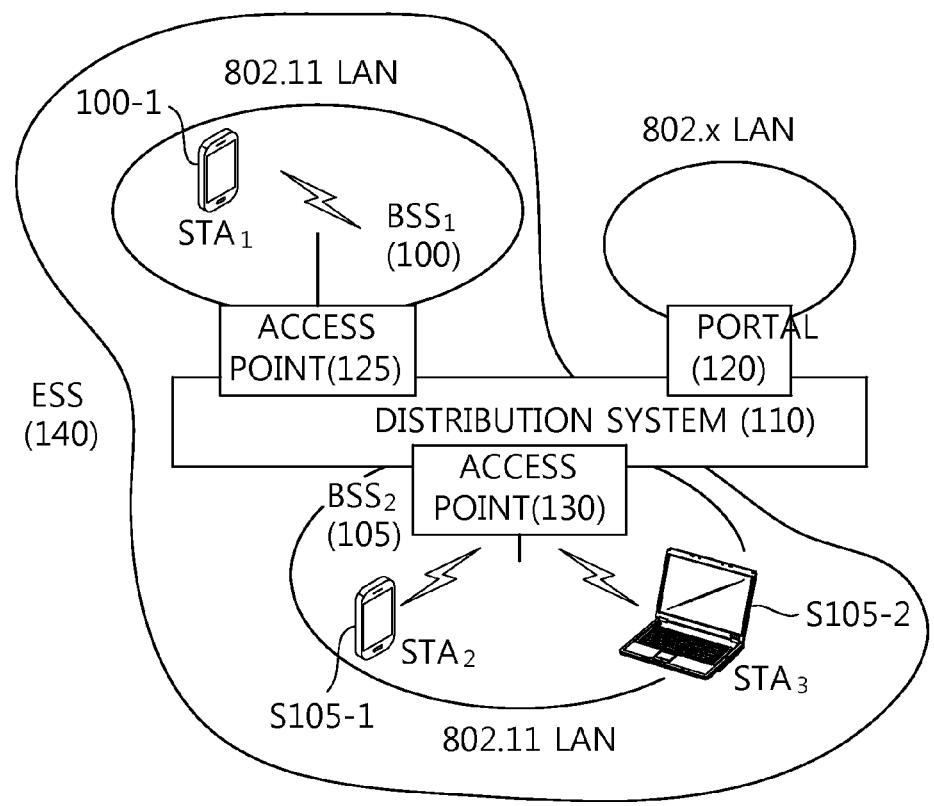
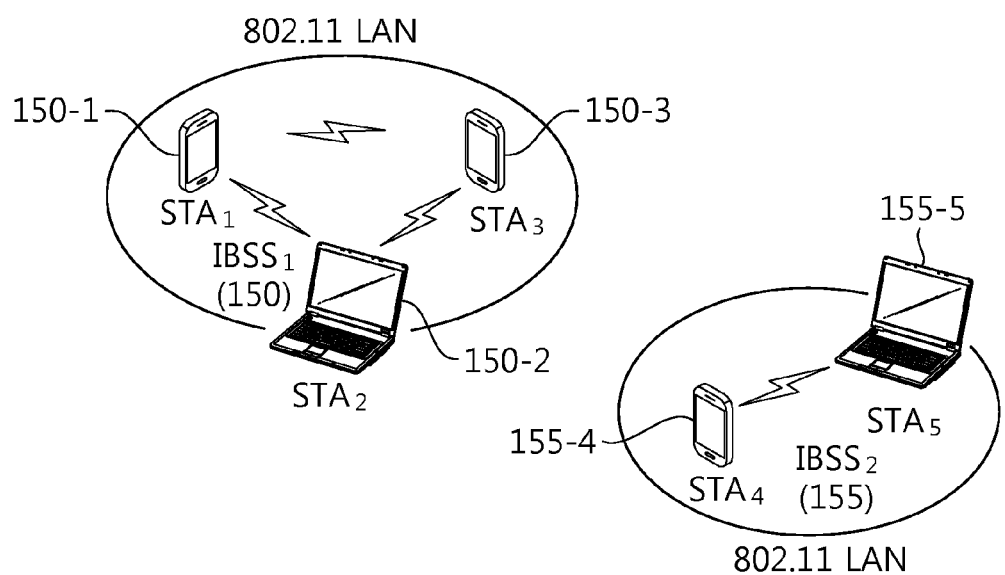

METHOD FOR TRANSMITTING SIGNAL FIELD AND APPARATUS THEREFOR

CROSS-REFERENCE TO RELATED APPLICATIONS

This application is the National Stage filing under 35 U.S.C. 371 of International Application No. PCT/KR2014/003418, filed on Apr. 18, 2014, which claims the benefit of U.S. Provisional Application No. 61/813,644, filed on Apr. 19, 2013 and 61/821,732, filed on May 10, 2013, the contents of which are all hereby incorporated by reference herein in their entirety.

BACKGROUND OF THE INVENTION

Field of the Invention

The present invention relates to wireless communications, and more particularly, to a method and an apparatus for transmitting a signal field in a wireless local area network (WLAN).

Related Art

The Institute of Electrical and Electronics Engineers (IEEE) 802.11 Wireless Next Generation Standing Committee (WNG SC) is an ad hoc committee which conducts medium- and long-term examinations on a next-generation wireless local area network (WLAN).

At the IEEE conference in March, 2013, Broadcom suggested, based on the WLAN standardization history, the need for discussions on the next-generation WLAN subsequent to IEEE 802.11ac in the first half of 2013 when the IEEE 802.11ac standards were finalized. On the basis of technical necessity and need for standardization, a motion for creating a study group for the next-generation WLAN was carried at the IEEE conference in March, 2013.

The scope of the HEW mainly discussed by the study group for the next-generation WLAN so called a high efficiency WLAN (HEW) includes 1) improvement in a 802.11 physical (PHY) layer and medium access control (MAC) layer in 2.4 GHz and 5 GHz bands, 2) increase in spectrum efficiency and area throughput, and 3) performance improvement in actual indoor and outdoor environments, such as environments including interference sources, crowded heterogeneous networks and environments having high user load. The HEW mostly considers a scenario of an environment crowed with access points (APs) and stations (STAs), and the HEW conduct discussions on improvement in spectrum efficiency and area throughput in this situation. In particular, the HEW pays attention to improvement in practical performance not only in indoor environments but also in outdoor environments, which are not substantially considered in existing WLANs.

The HEW pays substantial attention to scenarios for a wireless office, a smart home, a stadium, a hotspot and a building/apartment, and discussions on system performance improvement in an environment crowed with APs and STAs based on a corresponding scenario are conducted.

Discussions are expected to be vigorous on system performance improvement in an overlapping basic service set (OBSS) environment and outdoor environment, instead of single link performance improvement in a single basic service set (BSS), and on cellular offloading. This HEW orientation means that the next-generation WLAN gradually has a similar technological scope to that of mobile communication. Considering that mobile communication technology is discussed along with WLAN technology in small cell and direct-to-direct (D2D) communications areas, technological and business convergence of the next-generation WLAN based on the HEW and mobile communication is expected to be further promoted.

SUMMARY OF THE INVENTION

An aspect of the present invention is to provide a method and an apparatus for transmitting a signal field in a wireless communication system.

Another aspect of the present invention is to provide a method and an apparatus for receiving a signal field.

To achieve an aspect of the present invention, a method for transmitting a signal field in a wireless local area network (WLAN) according to one embodiment of the present invention includes generating a signal field by a first station (STA) and transmitting, by the first STA, the signal field to a second STA in a first orthogonal frequency division multiplexing (OFDM) symbol, a second OFDM symbol and a third OFDM symbol, wherein at least one of a second constellation used in the second OFDM symbol and a third constellation used in the third OFDM symbol may be rotated based on a first constellation used in the first OFDM symbol.

To achieve another aspect of the present invention, an STA transmitting a signal field in a WLAN according to one embodiment of the present invention includes a radio frequency (RF) unit configured to transmit and receive a radio signal and a processor selectively connected to the RF unit, wherein the processor may be configured to generate a signal field and to transmit the signal field to a reception STA in a first OFDM symbol, a second OFDM symbol and a third OFDM symbol, and at least one of a second constellation used in the second OFDM symbol and a third constellation used in the third OFDM symbol may be rotated based on a first constellation used in the first OFDM symbol A newly defined physical layer convergence procedure (PLCP) protocol data unit (PPDU) may be detected while maintaining auto-detection rules for an existing PPDU. A station (STA) may determine whether a received PPDU is a newly defined PPDU based on a modulation scheme of a field included in the newly defined PPDU, having backward compatibility with an existing WLAN system.

BRIEF DESCRIPTION OF THE DRAWINGS

FIG. 1 is a schematic view illustrating a structure of a wireless local area network (WLAN).

DESCRIPTION OF EXEMPLARY EMBODIMENTS

FIG. 1 is a concept view illustrating the structure of a wireless local area network (WLAN).

FIG. 1(A) shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in FIG. 1(A), a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

The lower part of FIG. 1 is a concept view illustrating an independent BSS.

Referring to FIG. 1(B), the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
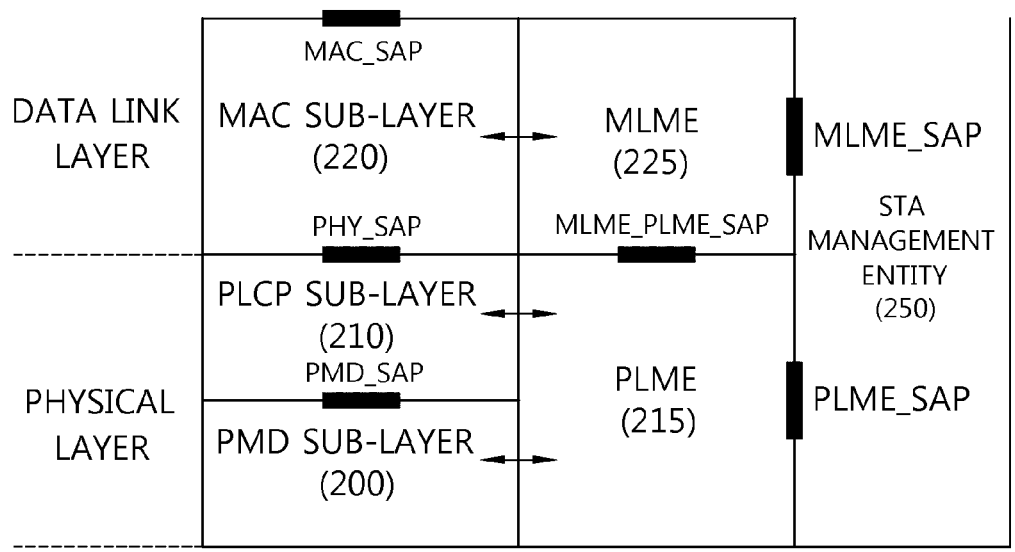
FIG. 2 is a diagram illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
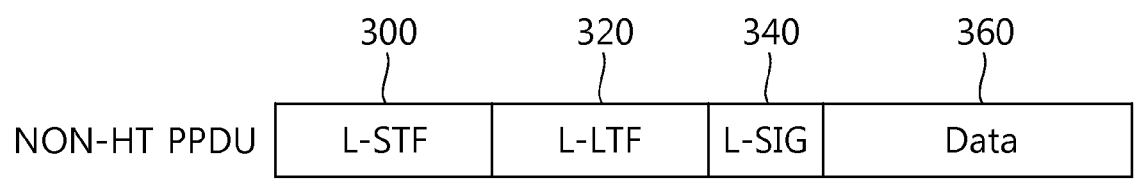
FIG. 3 is a schematic view illustrating a physical layer convergence procedure (PLCP) protocol data unit (PPDU) in a non-high throughput (HT) format.

FIG. 3 is a schematic view illustrating a physical layer convergence procedure (PLCP) protocol data unit (PPDU) in a non-high throughput (HT) format.

FIG. 3 illustrates a non-HT PPDU format supporting IEEE 802.11a/g. A PPDU in a non-HT format ("non-HT PPDU") may also be represented as a PPDU in a legacy format ("legacy PPDU").

Referring to FIG. 3, the non-HT PPDU may include a legacy-short training field (L-STF) 300, a legacy-long training field (L-LTF) 320, a legacy SIGNAL field (L-SIG) 340 and a Data 360.

The L-STF 300 may include a short training orthogonal frequency division multiplexing (OFDM) symbol. The L-STF 300 may be used for frame detection, automatic gain control (AGC), diversity detection and coarse frequency/time synchronization.

The L-LTF 320 may include a long training OFDM symbol. The L-LTF 320 may be used for fine frequency/time synchronization and channel prediction.

The L-SIG 340 may be used to transmit control information. The L-SIG 340 may include information on data rate and data length.

The Data 360 is a payload, which may include a SERVICE field, a scrambled PLCP service data unit (PSDU), tail bits and padding bits.

Figure 4:
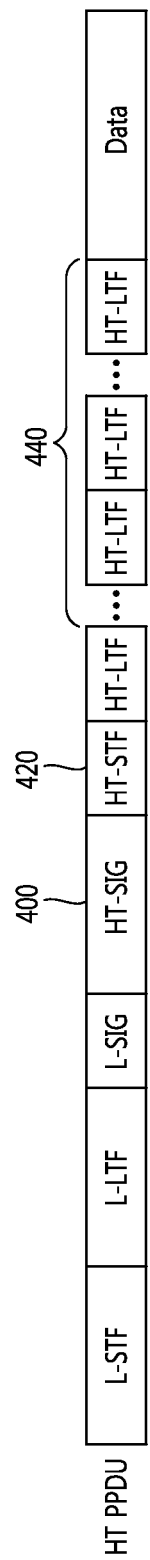
FIG. 4 is a schematic view illustrating a PPDU in an HT format.

FIG. 4 is a schematic view illustrating a PPDU in an HT format.

FIG. 4 illustrates a PPDU in an HT-mixed format ("HT-mixed PPDU") for supporting both IEEE 802.11n and IEEE 802.11a/g among PPDUs in the HT format ("HT PPDUs").

Referring to FIG. 4, the HT-mixed PPDU may further include an HT-SIG 400, an HT-STF 420 and an HT-LTF 440 in addition to the non-HT PPDU illustrated in FIG. 3.

The HT-SIG 400 may include information for interpreting the HT-mixed PPDU. For example, the HT-SIG 400 may include a modulation and coding scheme (MCS) information, PSDU length information, space time block coding (STBC) information, or the like.

The HT-STF 420 may be used for improvement in AGC performance, timing synchronization and frequency synchronization. The HT-STF 420 has a total length of 4 μs, which is the same as that of the L-STF, but have a different cyclic delay value from the L-STF.

The HT-LTF 440 may be used for multiple-input multiple-output (MIMO) channel estimation and fine carrier frequency offset (CFO) estimation. An station (STA) supporting IEEE 802.11n needs to estimate as many channels as the number of space time streams (or spatial streams), and thus the number of HT-LTFs 440 may increase depending on the number of space time stream.

Figure 5:
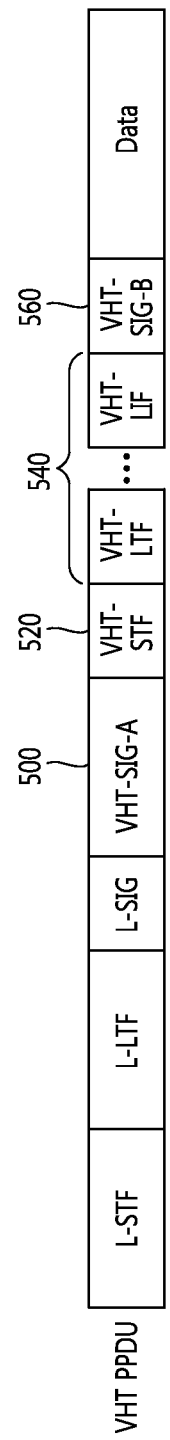
FIG. 5 is a schematic view illustrating a PPDU in a very high throughput (VHT) format.

FIG. 5 is a schematic view illustrating a PPDU in a very high throughput (VHT) format.

Referring to FIG. 5, the PPDU in the VHT format ("VHT PPDU") may include an L-STF, an L-LTF, an L-SIG, a VHT-SIG-A, a VHT-STF, VHT-LTFs, a VHT-SIG-B and a Data.

The L-STF field, L-LTF field and L-SIG field are fields included in a non-HT PPDU as described above in FIG. 3. The remaining VHT-SIG-A 500, VHT-STF 520, VHT-LTF 540 and VHT-SIG-B 560 may be included only in the VHT PPDU.

The VHT-SIG-A 500 may include information for interpreting the VHT PPDU. The VHT-SIG-A 500 may include a VHT-SIG-A1 and a VHT-SIG-A2. The VHT-SIG-A1 may include bandwidth information on a used channel, whether space time block coding is applied, a group identifier (ID) indicating a group used for transmission of grouped STAs in multi-user (MU) MIMO and information on the number of used streams.

The VHT-SIG-A2 may include information on whether a short guard interval (GI) is used, forward error correction (FEC) information, information on an MCS for a single user, information on channel coding types for multiple users, beamforming related information, redundancy bits for cyclic redundancy checking (CRC) and tail bits of a convolutional decoder.

The VHT-STF 520 may be used to improve automatic gain control estimation in an MIMO environment.

The VHT-LTF 540 is used to estimate a channel in an MIMO environment.

The VHT-SIG-B 560 may include information on each STA, that is, information on PSDU length and a MCS, tail bits, or the like.

Figure 6:
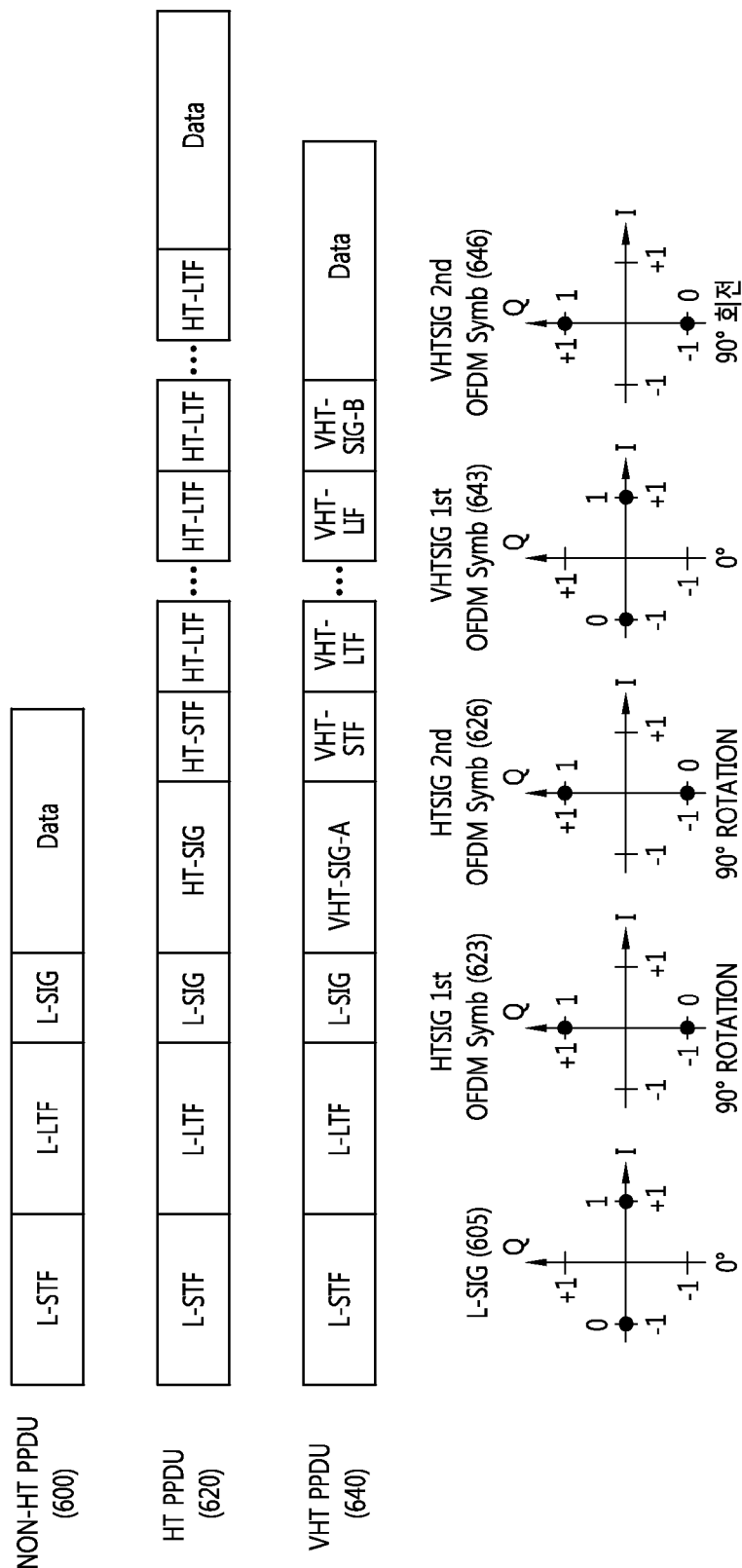
FIG. 6 is a schematic view illustrating a method of transmitting a field included in each PPDU.

FIG. 6 is a schematic view illustrating a method of transmitting a field included in each PPDU.

FIG. 6 illustrates a modulation scheme for a field included in each PPDU (non-HT PPDU 600, HT PPDU 620 or VHT PPDU 640). An STA may distinguish a PPDU based on a modulation scheme for a field included in a received PPDU. Distinguishing a PPDU (or distinguishing a PPDU format) may be interpreted in different meaning. For example, distinguishing a PPDU may include determining whether a received PPDU is decodable (or interpretable) by an STA. Further, distinguishing a PPDU may mean determining whether a received PPDU is a PPDU that an STA is capable of supporting. Alternatively, distinguishing a PPDU may mean distinguishing what information transmitted through a received PPDU is.

If PPDUs are in different formats, different modulation schemes may be used for fields after an L-SIG. The STA may distinguish a PPDU format based on a modulation scheme for fields after an L-SIG included in a received PPDU.

In a non-HT PPDU 600 illustrated at the top of FIG. 6, a modulation scheme for an L-SIG may be binary phase shift keying (BPSK). Specifically, data transmitted through an OFDM symbol 605 corresponding to the L-SIG may be generated based on a constellation for BPSK ("BPSK constellation").

In an HT PPDU 620 illustrated in the middle of FIG. 6, a modulation scheme for an HT-SIG after an L-SIG may be QBPSK. Specifically, data transmitted through a first OFDM symbol 623 and a second OFDM symbol 626 corresponding to the HT-SIG may be generated based on a constellation for QBPSK ("QBPSK constellation"). The QBPSK constellation may be a constellation rotated counterclockwise by 90 degrees based on the BPSK constellation. The STA may distinguish a PPDU based on a received modulation scheme for a field.

For example, the STA may detect a start point of the HT-SIG based on an in-phase (I)/quadrature (Q) signal-power ratio of received data. Specifically, the STA may detect the HT-SIG based on a change in a modulation scheme (or change in a constellation) used for the received data. Further, the STA may determine whether the received PPDU is a non-HT PPDU or HT PPDU based on information on the modulation scheme (or constellation) used for the received data.

In a VHT PPDU 640 illustrated at the bottom of FIG. 6, a modulation scheme for a VHT-SIG-A after an L-SIG may be BPSK and QBPSK. Specifically, data transmitted through a first OFDM symbol 643 corresponding to the VHT-SIG-A may be generated based on a BPSK constellation, and data transmitted through a second OFDM 646 corresponding to the VHT-SIG-A may be generated based on a QBPSK constellation.

Likewise, the STA may detect a VHT-SIG-A based on a change in a modulation scheme (or change in a constellation) used for the received data. Also, the STA may determine whether the received PPDU is a non-HT PPDU, HT PPDU or VHT PPDU based on information on the modulation scheme (or constellation) used for the received data.

A modulation scheme for a field by each PPDU format for distinguishing a PPDU may be represented by a term "auto-detection rule." The STA may distinguish a PPDU based on a modulation scheme for a received field according to the auto-detection rule.

Hereinafter, an embodiment of the present invention illustrates a method for distinguishing not only an existing PPDU (non-HT PPDU, HT PPDU or VHT PPDU) but also a PPDU in a high efficiency WLAN (HEW) format defined in an HEW as a next-generation WLAN based on a modulation scheme for a field included in a received PPDU.

In the present invention, a next-generation WLAN may be represented by a high efficiency WLAN (HEW), a frame supporting an HEW by an HEW frame, a PPDU supporting an HEW by a PPDU in an HEW format ("HEW PPDU"), and an STA supporting an HEW by an HEW STA hereinafter for convenience of description.

In addition, a PPDU other than an HEW PPDU, such as a non-HT PPDU, HT PPDU or VHT PPDU, may be represented by a legacy PPDU, a frame transmitted and received with a legacy PPDU by a legacy frame, and an STA supporting only a legacy PPDU by a legacy STA.

When an HEW PPDU is used, the HEW PPDU may be used to transmit and receive data in an environment where the HEW PPDU coexists with a legacy PPDU for legacy STAs supporting an existing WLAN system. In this environment, the legacy STAs may have no backward compatibility with respect to the HEW. Thus, the HEW PPDU needs to be defined not so as to affect the legacy STAs.

In a conventional auto-detection rule, different modulation schemes may be configured for fields located after an L-SIG in a received PPDU to distinguish PPDUs in different formats.

When an HEW PPDU is used, a method for an STA to distinguish the HEW PPDU is needed with the conventional auto-detection rule maintained. That is, it is necessary to define an HEW PPDU for supporting an HEW in a nested mode (in which a new method is introduced with a conventional mode maintained).

Hereinafter, an embodiment of the present invention illustrates an HEW PPDU for supporting an HEW in a nested mode (in which a new method is introduced with a conventional mode maintained).

Figure 7:
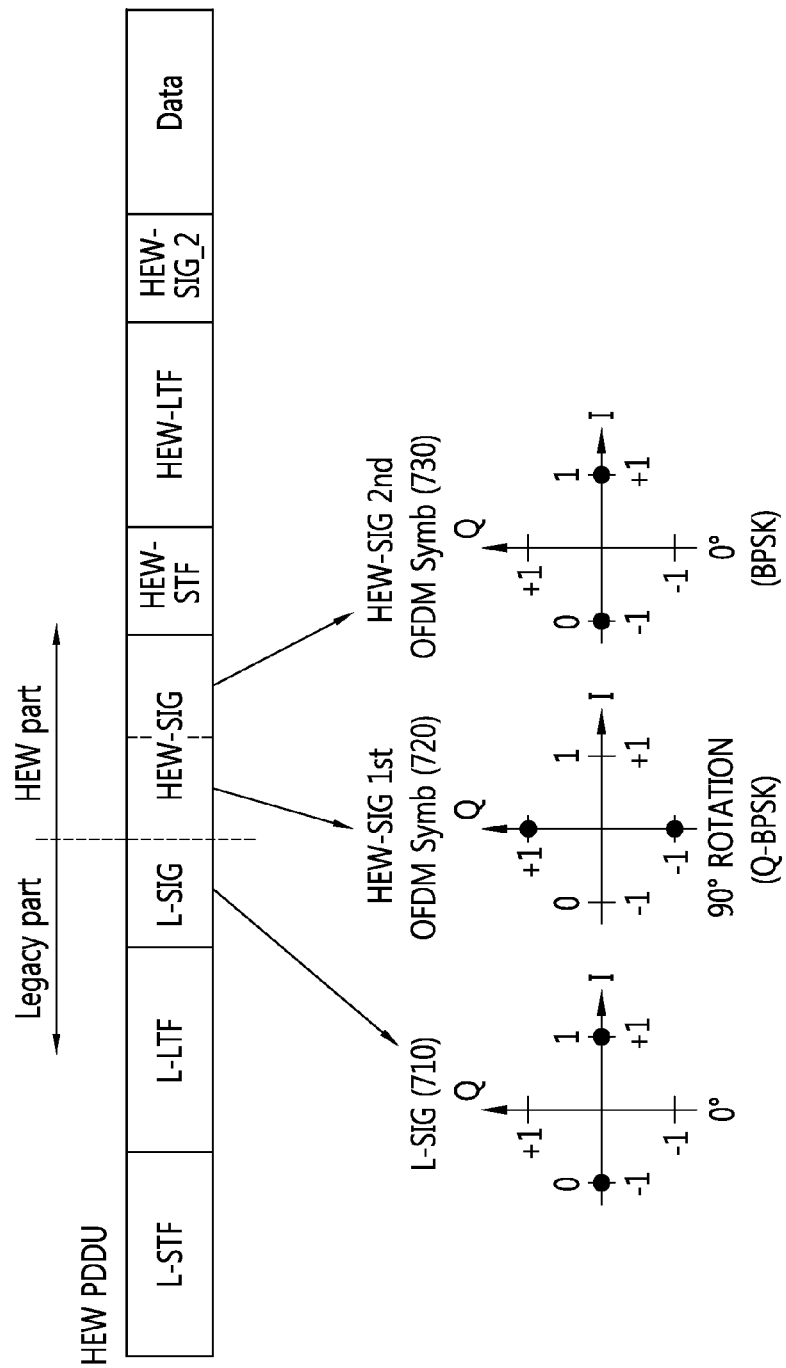
FIG. 7 is a schematic view illustrating a PPDU in a high efficiency WLAN (HEW) format according to the present invention.

FIG. 7 is a schematic view illustrating an HEW PPDU according to the present invention.

Referring to FIG. 7, the HEW PPDU may be divided into a legacy part to an L-SIG and an HEW part after the L-SIG for convenience. For example, the HEW part may include a field for supporting the HEW, such as HEW-SIG, HEW-STF, HEW-LTF and HEW-SIG2. These fields for supporting the HEW are illustrative fields for interpreting the HEW PPDU excluding the legacy part. An HEW-SIG may be located after the L-SIG of the legacy part. Information included in the HEW-SIG will be described later.

According to the embodiment of the present invention, the L-SIG and HEW-SIG may be generated based on the following modulation scheme in order to distinguish the HEW PPDU from a legacy PPDU.

In the HEW PPDU, a modulation scheme for the L-SIG may be BPSK. Specifically, data transmitted through an OFDM symbol (reference OFDM symbol) 710 corresponding to the L-SIG may be generated based on a BPSK constellation (reference constellation). That is, the BPSK constellation may be used in the OFDM symbol corresponding to the L-SIG. In the embodiment of the present invention, the L-SIG is described as corresponding to one OFDM symbol. However, if the L-SIG corresponds to a plurality of OFDMs, a reference OFDM symbol may be a last OFDM symbol among the plurality of OFDM symbols corresponding to the L-SIG.

In the HEW PPDU, a modulation scheme for the HEW-SIG may be QBPSK and BPSK. Specifically, data transmitted through a first OFDM symbol 720 corresponding to the HEW-SIG may be generated based on a QBPSK constellation. That is, the QBPSK constellation may be used in the first OFDM symbol corresponding to the HEW-SIG. The QBPSK constellation may be a constellation rotated by 90 degrees based on the BPSK constellation.

Data transmitted through a second OFDM symbol 730 corresponding to the HEW-SIG may be generated based on the BPSK constellation. That is, the BPSK constellation may be used in the second OFDM symbol corresponding to the HEW-SIG.

BPSK and QBPSK illustrated in the embodiment of the present invention are examples of difference modulation schemes. Also, BPSK may be referred to as a reference modulation scheme and QBPSK may be referred to as a rotated modulation scheme. The reference modulation scheme is a modulation scheme as a reference for comparison with another modulation scheme, and a constellation for the reference modulation scheme may be referred to as a reference constellation. The rotated modulation scheme may be a modulation scheme using a constellation rotated by a certain angle based on the reference constellation. For convenience of description, the embodiment of the present invention mostly illustrates changes in modulation schemes based on BPSK and QBPSK.

Table 1 below illustrates constellations used in OFDM symbols transmitting fields included in the legacy PPDU and the HEW PPDU.

TABLE 1

|  | Reference OFDM symbol (Constellation rotation angle) | First OFDM symbol (Constellation rotation angle) | Second OFDM symbol (Constellation rotation angle) |
| --- | --- | --- | --- |
| Non-HT PPDU | L-SIG (BPSK) (0 degrees) | Data field | Data field |
| HT PPDU | L-SIG (BPSK) (0 degrees) | HT-SIG (QBPSK) (90 degrees) | HT-SIG (QBPSK) (90 degrees) |

TABLE 1-continued

|  | Reference OFDM symbol (Constellation rotation angle) | First OFDM symbol (Constellation rotation angle) | Second OFDM symbol (Constellation rotation angle) |
|---|---|---|---|
| VHT PPDU | L-SIG (BPSK) (0 degrees) | VHT-SIG-A (BPSK) (0 degrees) | VHT-SIG-A (QBPSK) (90 degrees) |
| HEW PPDU | L-SIG (BPSK) (0 degrees) | HEW-SIG (QBPSK) (90 degrees) | HEW-SIG (BPSK) (0 degrees) |

Referring to FIG. 1, an STA may determine a modulation scheme (or a constellation used in an OFDM symbol) for data transmitted in the OFDM symbol (for example, the reference OFDM symbol, first OFDM symbol or second OFDM symbol) transmitting a received PPDU, thereby distinguishing the received PPDU. That is, the STA may determine rotation of the constellation used in the OFDM symbol transmitting the received PPDU, thereby distinguishing the received PPDU. Hereinafter, an embodiment of the present invention illustrates a method for an STA to determine a constellation used in an OFDM symbol to distinguish a received PPDU. Alternatively, the STA may determine rotation of a constellation used in an OFDM symbol to distinguish a received PPDU.

Hereinafter, a determination process for an STA to distinguish a received PPDU is illustrated.

Assuming that an HEW STA receives a PPDU, when a constellation used in the first OFDM symbol is not a QBPSK constellation, the HEW STA may determine the received PPDU as a VHT PPDU or non-HT PPDU. The HEW STA may further determine whether a QBPSK constellation is used in the second OFDM symbol. When a QBPSK constellation is used in the second OFDM symbol, the STA may determine the received PPDU as a VHT PPDU.

When QBPSK is used in the first OFDM symbol, the HEW STA may further determine a constellation used in the second OFDM symbol to distinguish the PPDU. For example, the HEW STA may determine whether a BPSK constellation or a QBPSK constellation is used in the second OFDM symbol. When a QBPSK constellation is used in the second OFDM symbol, the HEW STA may distinguish the received PPDU as an HT PPDU. When a BPSK constellation is used in the second OFDM symbol, the HEW STA may distinguish the received PPDU as an HEW PPDU.

Likewise, assuming that a legacy STA receives a PPDU, the legacy STA may determine a constellation used in the first OFDM symbol after the reference OFDM symbol or in both the first OFDM symbol and the second OFDM symbol to distinguish the received PPDU.

For example, when a QBPSK constellation is not used in at least one of the first OFDM symbol and/or the second OFDM symbol, a non-HT STA may distinguish the received PPDU as a non-HT PPDU. When a QBPSK constellation is used in the first OFDM symbol and the second OFDM symbol, an HT STA may determine the received PPDU as an HT PPDU. When a BPSK constellation is used in the first OFDM symbol and a QBPSK constellation is used in the second OFDM symbol, a VHT STA may determine the received PPDU as a VHT PPDU.

The legacy STA may distinguish a PPDU based on an existing auto-detection method, and delay channel access if the PPDU is not distinguished by the existing auto-detection method (for example, when the received PPDU is an HEW PPDU).

Based on rotations of the constellations used in the OFDM symbols in Table 1, the legacy STA may distinguish a PPDU in the same manner as the existing method, and the HEW STA may distinguish an HEW PPDU.

Various methods may be used for an STA to determine constellations used in OFDM symbols included in a legacy PPDU and an HEW PPDU. For instance, the STA may compare a norm value of a real part and an imaginary part of a modulation symbol transmitted through an OFDM symbol with a preset threshold, thereby determining whether a constellation used to generate the modulation symbol is a BPSK constellation or QBPSK constellation.

In the HEW, not only the constellations illustrated in FIG. 7 but various combinations of constellations may also be used to generate a PPDU.

Figure 8:
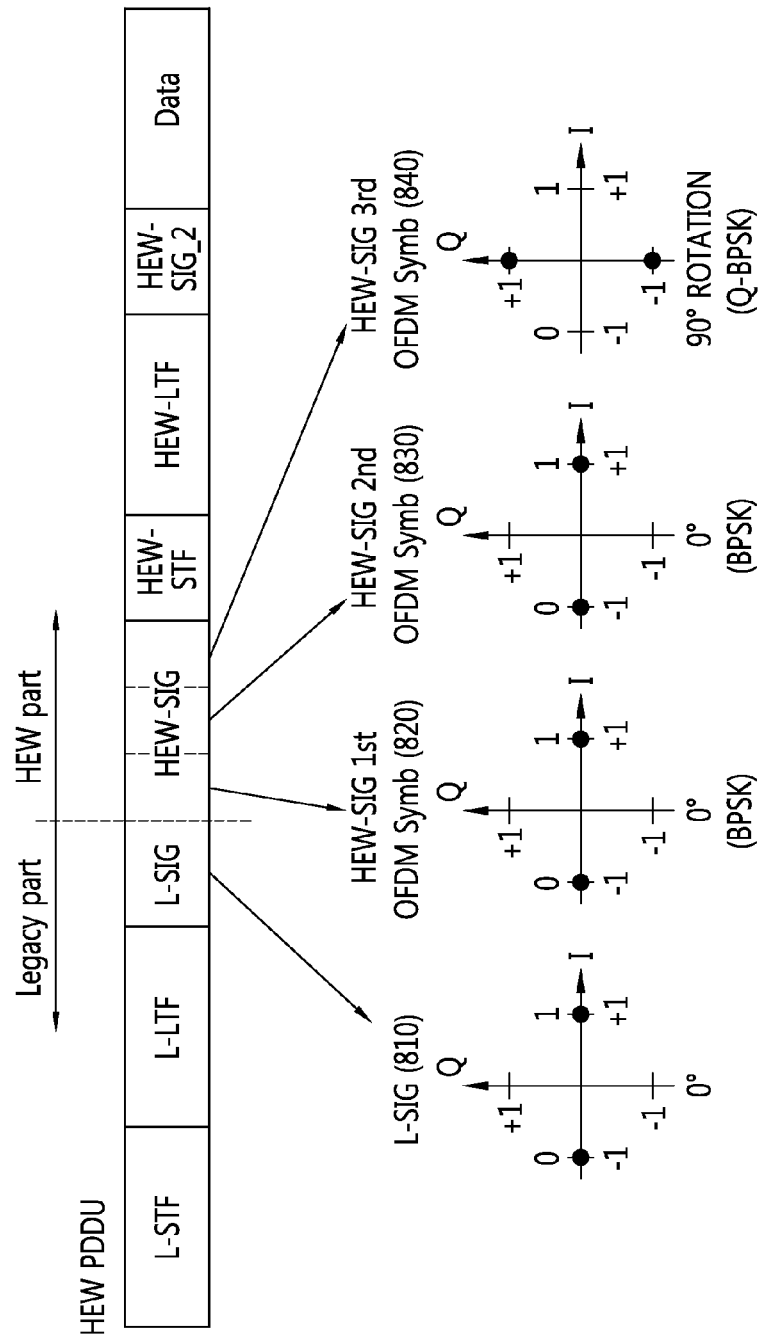
FIG. 8 is a schematic view illustrating a PPDU in an HEW format according to the present invention.

FIG. 8 is a schematic view illustrating an HEW PPDU according to the present invention.

When the constellations illustrated in Table 1 are used in OFDM symbols, a reference OFDM symbol and a first OFDM symbol which transmit an HEW PPDU and an HT PPDU use the same constellation. Thus, if an HT STA automatically detects only from the reference OFDM symbol to the first OFDM symbol, the HT STA may not distinguish whether a received PPDU is an HT PPDU or HEW PPDU.

FIG. 8 illustrates a method for an HT STA to detect only from an OFDM symbol (reference OFDM symbol) corresponding to an L-SIG to a first OFDM symbol corresponding to an HT SIG to distinguish whether a received PPDU is an HT PPDU. In FIG. 8, an HEW-SIG is assumed to be a field corresponding to three OFDM symbols (first OFDM symbol 820, second OFDM symbol 830 and third OFDM symbol 840). In an HEW system, new techniques not used in a conventional WLAN system, such as orthogonal frequency division multiple access (OFDMA) and uplink (UL) multi-user (MU)-MIMO, may be used. Further, in the HEW system, techniques for improving communication performance in a dense environment where multiple APs and multiple STAs are present. Thus, in the HEW system, additional information and/or fields for other functions than those in the conventional WLAN may be defined. Therefore, an HEW-SIG may be constituted by extended three symbols or more, not by two symbols in the conventional system.

Table 2 below illustrates constellations used in OFDM symbols transmitting fields included in the legacy PPDU and the HEW PPDU.

TABLE 2

|  | Reference OFDM symbol (Constellation rotation angle) | First OFDM symbol (Constellation rotation angle) | Second OFDM symbol (Constellation rotation angle) | Third OFDM symbol (Constellation rotation angle) |
|---|---|---|---|---|
| Non-HT PPDU | L-SIG (BPSK) (0 degrees) | Data field | Data field | Data field |
| HT PPDU | L-SIG (BPSK) (0 degrees) | HT-SIG (QBPSK) (90 degrees) | HT-SIG (QBPSK) (90 degrees) | HT-STF |

TABLE 2-continued

| | Reference OFDM symbol (Constellation rotation angle) | First OFDM symbol (Constellation rotation angle) | Second OFDM symbol (Constellation rotation angle) | Third OFDM symbol (Constellation rotation angle) |
|---|---|---|---|---|
| VHT PPDU | L-SIG (BPSK) (0 degrees) | VHT-SIG-A (BPSK) (0 degrees) | VHT-SIG-A (QBPSK) (90 degrees) | VHT-STF |
| HEW PPDU | L-SIG (BPSK) (0 degrees) | HEW-SIG (BPSK) (90 degrees) | HEW-SIG (BPSK) (0 degrees) | HEW-SIG (QBPSK) (90 degrees) |

Referring to Table 2, an HT-SIG may be transmitted through two OFDM symbols (first OFDM symbol and second OFDM symbol). Constellations used by the first OFDM symbol and the second OFDM symbol, which transmit the HT-SIG, may be rotated by 90 degrees based on a constellation used by the reference OFDM symbol.

A VHT-SIG may be transmitted through two OFDM symbols (first OFDM symbol and second OFDM symbol). A constellation used by the first OFDM symbol, which transmits the VHT-SIG, may be the same as the constellation for the reference OFDM symbol. Also, a constellation used by the second OFDM symbol, which transmits the VHT-SIG, may be rotated by 90 degrees based on the constellation used by the reference OFDM symbol.

According to the embodiment of the present invention, an HEW-SIG may be transmitted through three OFDM symbols (first OFDM symbol 820, second OFDM symbol 830 and third OFDM symbol 840). Constellations used by the first OFDM symbol 820 and the second OFDM symbol 830, which transmit the HEW-SIG, may be the same as a constellation used by a reference OFDM symbol 810. Also, a constellation used by the third OFDM symbol 840, which transmits the HEW-SIG, may be a constellation rotated counterclockwise by 90 degrees based on the constellation used by the reference OFDM symbol 810. Although the HEW-SIG may be transmitted through three or more OFDM symbols, the HEW-SIG is assumed to be transmitted through three OFDM symbols for convenience of description.

Illustrated is a determination process for a legacy STA and an HEW STA to distinguish a received PPDU when the constellations used in the OFDM symbols which transmit the HEW-SIG as in Table 2 are determined Among legacy STAs, an HT STA and VHT STA are capable of distinguishing a received PPDU based on the existing auto-detection rule. In detail, the HT STA may detect the reference OFDM symbol and the first OFDM symbol, and distinguish a received PPDU as an HT PPDU when a QBPSK constellation is used in the first OFDM symbol. The VHT STA may distinguish the received PPDU as a VHT PPDU when a BPSK constellation is used in the first OFDM symbol and a QBPSK constellation is used in the second OFDM symbol. The HT STA and VHT STA of legacy STAs may delay channel access when identifying that the received PPDU is neither an HT PPDU nor a VHT PPDU.

Among legacy STAs, a non-HT STA may detect from the reference OFDM symbol to the third OFDM symbol, and distinguish a received PPDU not as a non-HT PPDU when a QBPSK constellation is used in the third OFDM symbol. In this case, the non-HT STA may also delay channel access.

An HEW STA may determine constellations used in from the reference OFDM symbol to the three OFDM symbol to distinguish a PPDU. The HEW STA may distinguish an HT PPDU and a VHT PPDU based on constellations used by the reference OFDM symbol to the second OFDM symbol. Also, the HEW STA may distinguish a non-HT PPDU and an HEW PPDU based on a constellation used by the third OFDM symbol.

In addition to the constellations in Table 2, various constellations (case 1 to case 6) below may be used in the reference OFDM symbol to the third OFDM symbol in order to distinguish an HEW PPDU from PPDUs in other formats.

TABLE 3

| | Reference OFDM symbol (Constellation rotation angle) | First OFDM symbol (Constellation rotation angle) | Second OFDM symbol (Constellation rotation angle) | Third OFDM symbol (Constellation rotation angle) |
|---|---|---|---|---|
| Non-HT PPDU | L-SIG (BPSK) (0 degrees) | Data field | Data field | Data field |
| HT PPDU | L-SIG (BPSK) (0 degrees) | HT-SIG (QBPSK) (90 degrees) | HT-SIG (QBPSK) (90 degrees) | HT-STF |
| VHT PPDU | L-SIG (BPSK) (0 degrees) | VHT-SIG-A (BPSK) (0 degrees) | VHT-SIG-A (QBPSK) (90 degrees) | VHT-STF |
| HEW PPDU (Case 1) | L-SIG (BPSK) (0 degrees) | HEW-SIG (QBPSK) (90 degrees) | HEW-SIG (BPSK) (0 degrees) | HEW-SIG (BPSK) (0 degrees) |
| HEW PPDU (Case 2) | L-SIG (BPSK) (0 degrees) | HEW-SIG (BPSK) (0 degrees) | HEW-SIG (QBPSK) (90 degrees) | HEW-SIG (BPSK) (0 degrees) |
| HEW PPDU (Case 3) | L-SIG (BPSK) (0 degrees) | HEW-SIG (QBPSK) (90 degrees) | HEW-SIG (QBPSK) (90 degrees) | HEW-SIG (BPSK) (0 degrees) |
| HEW PPDU (Case 4) | L-SIG (BPSK) (0 degrees) | HEW-SIG (BPSK) (0 degrees) | HEW-SIG (QBPSK) (90 degrees) | HEW-SIG (QBPSK) (90 degrees) |

TABLE 3-continued

| | Reference OFDM symbol (Constellation rotation angle) | First OFDM symbol (Constellation rotation angle) | Second OFDM symbol (Constellation rotation angle) | Third OFDM symbol (Constellation rotation angle) |
|---|---|---|---|---|
| HEW PPDU (Case 5) | L-SIG (BPSK) (0 degrees) | HEW-SIG (QBPSK) (90 degrees) | HEW-SIG (BPSK) (0 degrees) | HEW-SIG (QBPSK) (90 degrees) |
| HEW PPDU (Case 6) | L-SIG (BPSK) (0 degrees) | HEW-SIG (QBPSK) (90 degrees) | HEW-SIG (QBPSK) (90 degrees) | HEW-SIG (QBPSK) (90 degrees) |

In an HEW PPDU, unlike a legacy PPDU, an HEW-SIG may be transmitted through three OFDM symbols. Thus, the HEW STA may distinguish an HEW PPDU based on the constellations used in the reference OFDM symbol to the third OFDM symbol as in Table 3. According to the embodiment of the present invention, at least one of the first OFDM symbol to the third OFDM symbol corresponding to the HEW-SIG may use a QBPSK constellation.

To support an HEW, a signal field, such as the HEW-SIG, may include various pieces of information. For example, when channel access is performed based on OFDMA, information on a frequency resource (for example, a channel) for data transmission and reception of an STA, DL resource allocation and UL resource allocation information, or the like may be transmitted through the signal field. The signal field may also include information for supporting UL MIMO. In addition, the signal field may include information for interference management in an STA dense environment where interference is serious. Hereinafter, an embodiment of the present invention illustrates an example of information included in a signal field in detail.

Figure 9:
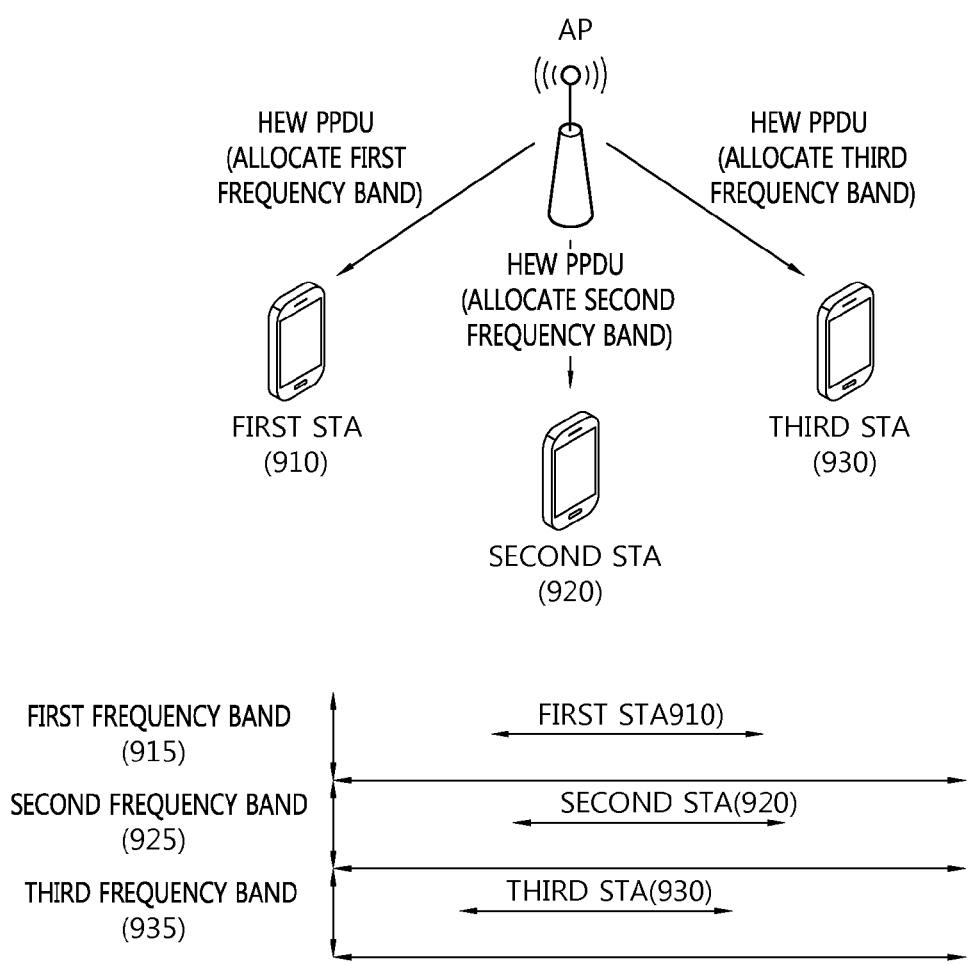
FIG. 9 is a schematic view illustrating a wireless communication method in an HEW according to an embodiment of the present invention.

FIG. 9 is a schematic view illustrating a wireless communication method according to an embodiment of the present invention.

An HEW may support OFDMA in a multiple access mode.

Unlike a legacy WLAN, an HEW allows a plurality of STAs to simultaneously communicate with an AP based on frequency resources allocated to the respective STAs.

Referring to FIG. 9, a first STA 910, a second STA 920 and a third STA 930 may be allocated a first frequency band 915, a second frequency band 925 and a third frequency band 935, respectively, and communicate with the AP through the respective frequency bands.

The AP may allocate a frequency band for communication to each of the STAs. The frequency band allocated to each of the STA may be a frequency resource in various units. For example, the frequency band allocated to each of the STA may be one of a plurality of channels defined in a particular band (for example, 2.4 GHz band, 5 GHz band or 60 GHz band). Alternatively, the frequency band allocated to each of the STA may be a resource in a subunit of one divided channel.

Information on a frequency band allocated by each STA may be transmitted through an HEW PPDU. For example, an HEW-SIG (or signal field) included in the HEW PPDU may include information on a frequency band allocated to each STA. Specifically, the HEW-SIG may include a channel allocation field, and the channel allocation field may include information on a channel allocated to an STA.

For example, the AP may transmit information on a channel allocated to an individual STA to the STA through the HEW-SIG of the HEW PPDU. Alternatively, the AP may transmit information on a frequency band allocated based on an identifier (ID) of an STA (for example, a group ID (GID) and an association ID (AID)) through the HEW-SIG. In detail, the AP may allocate channels for a plurality of STAs in such a manner that a first channel is allocated to an STA corresponding to a first GID and a second channel to an STA corresponding to a second GID. In this manner, the respective channels are distributed for the plurality of STAs, so that the STAs performing access in the respective channels may be distributed.

Table 4 below illustrates a channel allocation field of an HEW-SIG which transmits channel allocation information.

TABLE 4

| | Allocated bits | Field | Number of bits | Description |
|---|---|---|---|---|
| HEW-SIG | xx | Channel allocation | aa | Channels allocated by GIDs of STAs<br>Channel 1 for Group ID a<br>Channel 2 for Group ID b<br>Channel 3 for Group ID c<br>. . .<br>Channel x for Group ID d |

The channel allocation field in Table 4 is an example for transmitting channel allocation information on each of a plurality of STAs. The HEW-SIG may include other types of information for supporting simultaneous channel access by the plurality of STAs in different frequency resources using diverse methods.

The AP may change the information in the channel allocation field included in the HEW-SIG depending on a channel load so that the STAs excessively converge on a particular channel.

Figure 10:
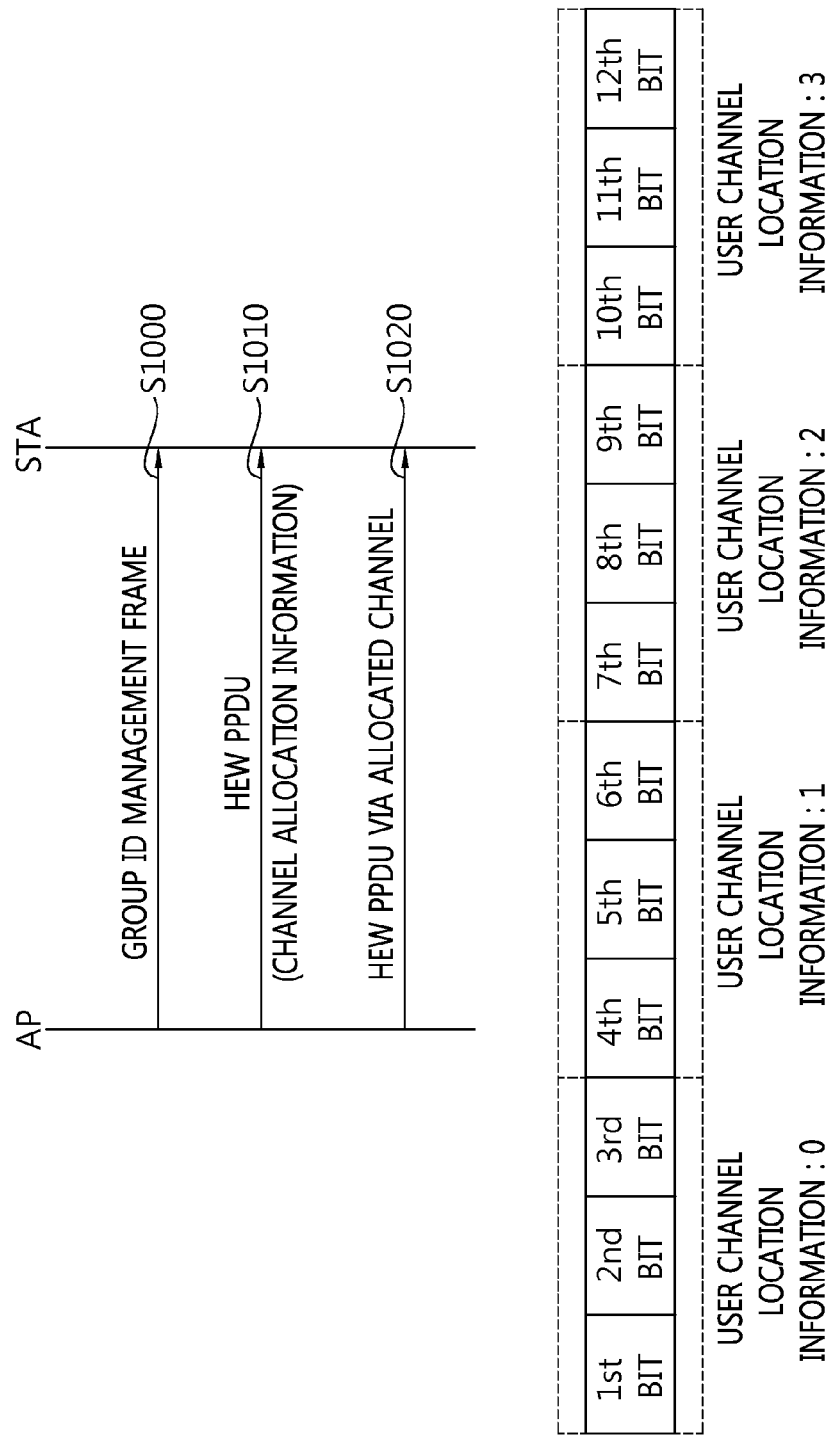
FIG. 10 is a schematic view illustrating a wireless communication method in an HEW according to an embodiment of the present invention.

FIG. 10 is a schematic view illustrating a wireless communication method in an HEW according to an embodiment of the present invention.

FIG. 10 illustrates another method for transmitting channel allocation information on each of a plurality of STAs. For instance, an AP may transmit a group ID field for an STA and a user channel location field for an STA through a group ID management frame to configure a group of the STA and allocate a channel for each STA.

Referring to FIG. 10, the AP may transmit a group ID management frame to an STA (step S1000).

The group ID management frame may include a group ID field and a user channel location field.

Figure 11:
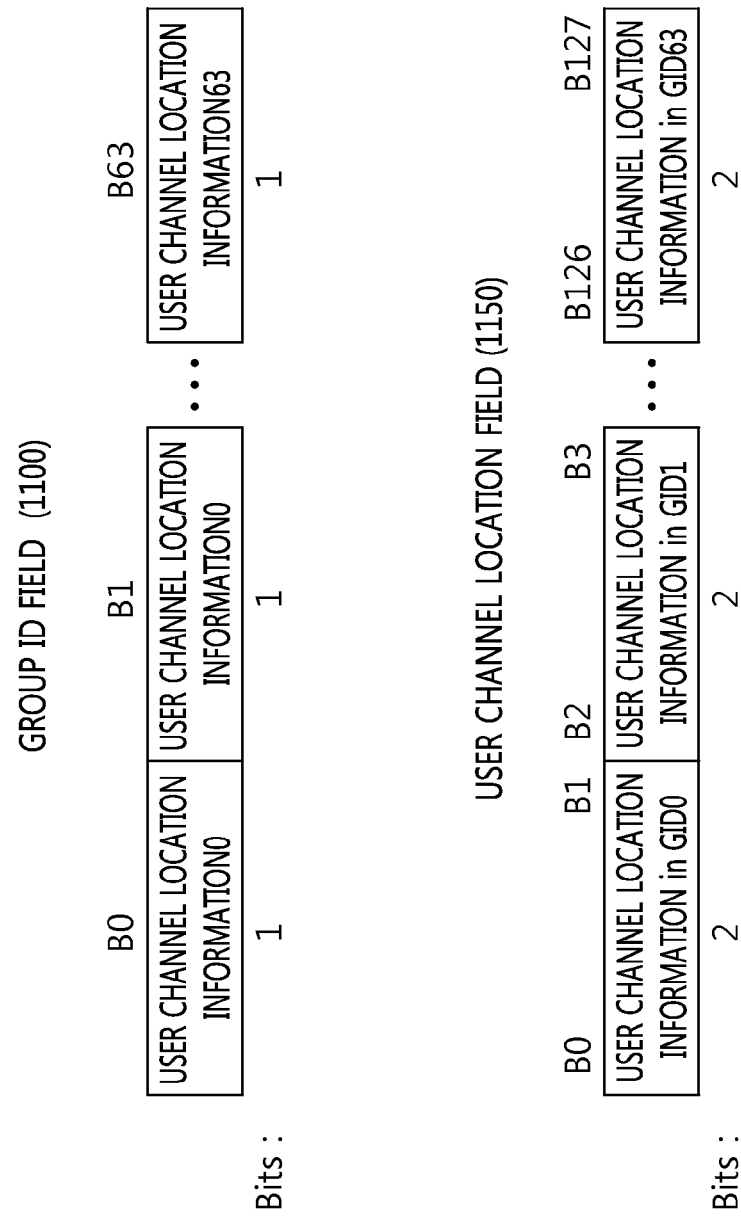
FIG. 11 is a schematic view illustrating a group identifier field and a user channel location field according to an embodiment of the present invention.

FIG. 11 is a schematic view illustrating a group ID field and a user channel location field according to an embodiment of the present invention.

Referring to the top of FIG. 11, a group ID field 1100 may include a plurality of subfields (group ID 0 indicator to group ID 63 indicator) in an array indicating respective group IDs. In order to indicate a group ID of the STA, a group ID x indicator corresponding to the group ID of the STA may be configured to 1 in the group ID field 1100. A group ID y indicator not corresponding to the group ID of the STA may be configured to 0. For example, when the group ID of the STA is 1, a group ID 1 indicator may be configured to 1 in the group ID field 1100 and the group ID field may be configured to '010000 . . . 0.'

Referring to the bottom of FIG. 11, a user channel location field 1150 may include a plurality of subfields (user channel location information in GID 1 to user channel location information in GID 63) in an array indicating user channel locations allocated to users included in a particular group. The STA may acquire user channel location information included in a subfield indicated based on the group ID of the STA in the user channel location field 1150. For example, when the STA has a group ID of 1, the STA may acquire user channel location information on the STA in user channel location information in GID 1.

The STA may acquire information on a channel allocated to the STA based on the user channel location information acquired based on the group ID management frame and channel allocation information on an HEW-SIG field to be subsequently received, which will be described later.

Table 5 below illustrates user channel location information corresponding to a bit value of a subfield (user channel location information in GID x).

TABLE 5

| User channel location information in GID x | User channel location information |
|---|---|
| 00 | 0 |
| 01 | 1 |
| 10 | 2 |
| 11 | 3 |

For example, when the STA has a group ID of 1, the AP may transmit channel location information on the STA through user channel location information in GID 1 corresponding to group ID field 1 in the user channel location field. When user channel location information in GID 1 has a value '00,' the STA may be allocated user channel location information of 0.

Referring back to FIG. 10, the AP transmits an HEW PPDU to the STA (step S1010).

The AP may transmit the HEW PPDU including an HEW-SIG to the STA. The HEW-SIG may include the channel allocation information allocated to the STA. Table 6 below illustrates the channel allocation information included in the HEW-SIG.

The channel allocation information in Table 6 is illustrated at the bottom of FIG. 10. That is, 12 bits corresponding to the channel allocation information may be divided into three-bit units to transmit channel information according to user channel location information (0, 1, 2, 3). By using this method, information on a channel to be used by a plurality of STAs included in the same group may be transmitted through the HEW-SIG.

In a specific example, as described above, when the STA has user channel location information of 0, the STA may be allocated a channel based on bit information corresponding to a first bit to a third bit of the channel allocation information. For instance, when the first bit to the third bit are '010,' the STA may be allocated a second channel. Likewise, when another STA has channel location information of 3, this STA may be allocated a channel based on bit information corresponding to tenth to twelfth bits of the channel allocation information through the same HEW-SIG.

The STA transmits the HEW PPDU through the allocated channel (step S1020).

The STA may transmit the HEW PPDU to the AP through the allocated channel based on the acquired user channel location information and the received channel allocation information in the HEW-SIG field.

Specific parameters, such as number of bits used for channel allocation information, allocated bits depending on individual user channel location information and a bit value of channel location information, listed in FIGS. 10 and 11 are illustrative examples, and various other parameters may be used.

Figure 12:
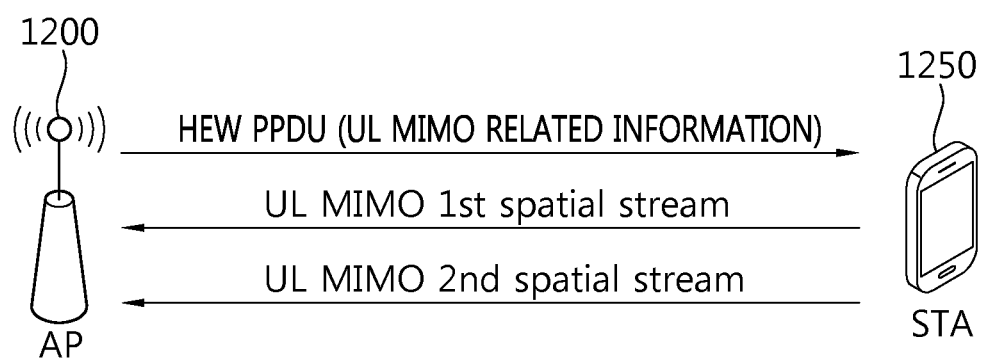
FIG. 12 is a schematic view illustrating a wireless communication method according to an embodiment of the present invention.

FIG. 12 is a schematic view illustrating a wireless communication method according to an embodiment of the present invention Referring to FIG. 12, an STA 1250 may transmit UL data to an AP 1200 using UL MIMO. When the HEW STA 1250 supports UL MIMO, various pieces of control information may be included and transmitted in an HEW PPDU. For example, the AP 1200 may include and transmit information on whether UL MIMO is possible in the HEW-SIG of the HEW PPDU. Also, the AP 1200 may include and transmit information on the number of space time streams (or spatial streams) available for UL MIMO and information on a channel to be used for UL MIMO in the HEW-SIG.

The STA 1250 may determine, based on the HEW-SIG, whether to perform UL MIMO, the number of space time streams to be used if UL MIMO is performed, and a channel used for performing UL MIMO.

For instance, the STA 1250 may perform UL MIMO based on two spatial streams through a first frequency band on the basis of the received HEW-SIG.

TABLE 6

| | Allocated bits | Field | Number of bits | Description |
|---|---|---|---|---|
| HEW-SIG | Bxx~Bxx + 11 | Channel allocation | 12 | 12 bits corresponding to channel allocation are divided into three-bit units to transmit channel information on particular user channel location information. First bit~third bit: Channel information on STA with user channel location information of 0 Fourth bit~sixth bit: Channel information on STA with user channel location information of 1 Seventh bit~ninth bit: Channel information on STA with user channel location information of 2 Tenth bit~twelfth bit: Channel information on STA with user channel location information of 3 |

Table 7 below illustrates an example of an HEW-SIG field which transmits UL MIMO related information.

TABLE 7

|  | Allocated bits | Field | Number of bits | Description |
|---|---|---|---|---|
| HEW-SIG | xx | Allowance of UL MIMO | aa | Set to 1 to allow UL MIMO<br>Set to 0 not to allow UL MIMO |
|  | yy | NSTS of UL MIMO | bb | Set 0 for 0 space time streams<br>Set 1 for 1 space time streams<br>Set 2 for 2 space time streams<br>Set 3 for 3 space time streams |
|  | zz | Channel of UL MIMO | cc | Channel xx |

The information in Table 7 is an illustrative example, at least one piece of which may be included. Further, the HEW-SIG may include other pieces of information for supporting UL MIMO of the STA.

Figure 13:
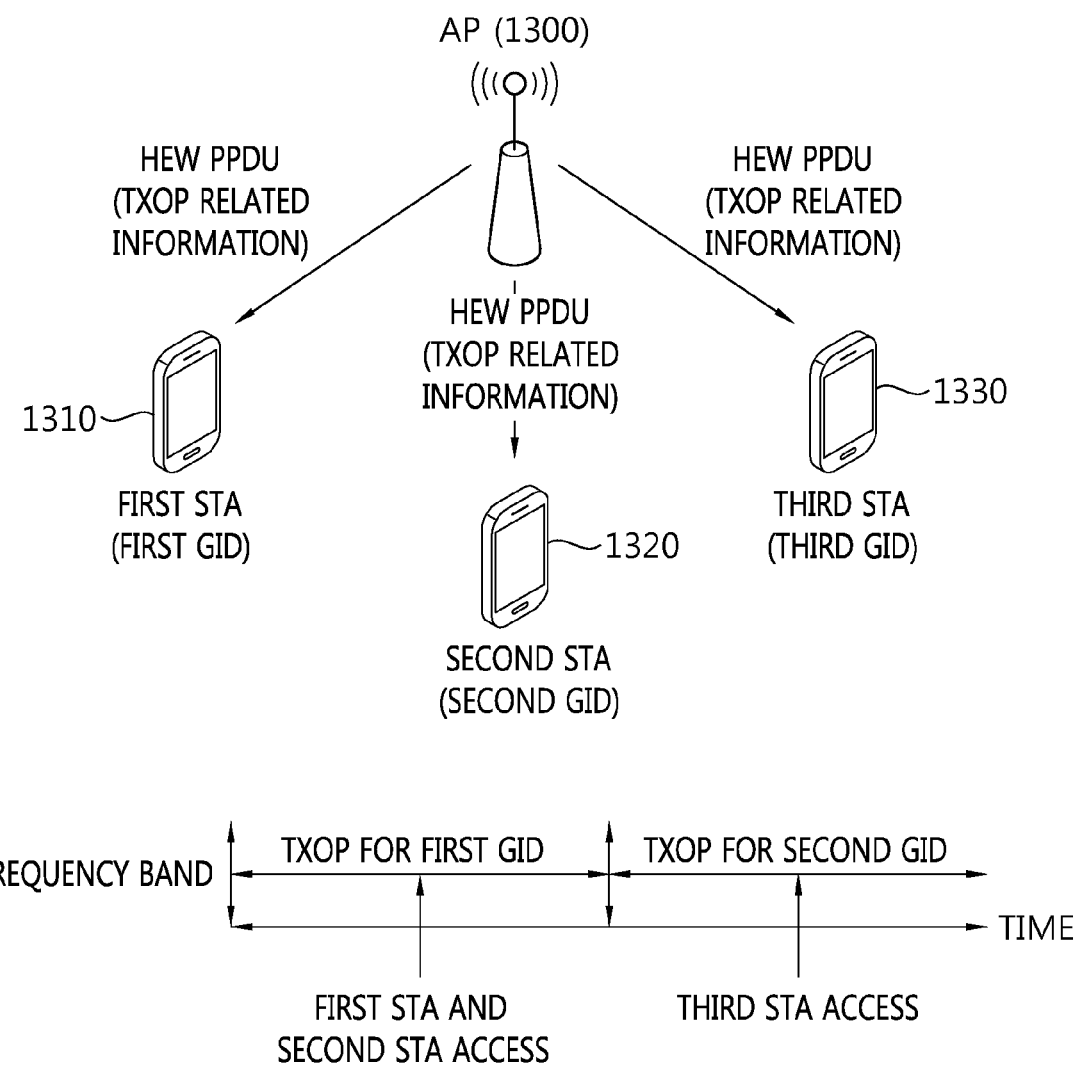
FIG. 13 is a schematic view illustrating a wireless communication method in an HEW according to an embodiment of the present invention.

FIG. 13 is a schematic view illustrating a wireless communication method in an HEW according to an embodiment of the present invention.

FIG. 13 illustrates a method for an AP to transmit information on a list of STAs acquiring a particular TXOP to the STAs.

Referring to FIG. 13, in the HEW, the AP may simultaneously communicate with a plurality of STAs and transmit information on STAs which simultaneously transmit and receive data.

The AP may include and transmit information on the number of STAs acquiring the same TXOP or on a list of STAs acquiring the same TXOP in an HEW-SIG. Also, the AP may transmit information on duration of the TXOP through the HEW-SIG.

For instance, the AP 1300 may impart a TXOP for particular ID information (for example, GID), and an STA may determine whether it is possible to transmit and receive data with the AP based on the HEW-SIG. The AP 1300 may allocate a TXOP for STAs 1310 and 1320 corresponding to a first GID and then a TXOP for an STA 1330 corresponding to a second GID.

Table 8 below illustrates an example of an HEW-SIG field which transmits TXOP related information.

TABLE 8

|  | Allocated bits | Field | Number of bits | Description |
|---|---|---|---|---|
| HEW-SIG | xx | TXOP | aa | Information on STA allocated TXOP<br>Set to 0 to allocate TXOP to first STA list<br>Set to 1 to allocate TXOP to second STA list<br>Set to 2 to allocate TXOP to third STA list |
|  | yy | TXOP duration | bb | Set to 1 for first duration<br>Set to 0 for second duration |

The information in Table 8 is an illustrative example, at least one piece of which may be included. Further, the HEW-SIG may include other pieces of information for configuring a TXOP for an STA.

Figure 14:
FIG. 14 is a schematic view illustrating a wireless communication method in an HEW according to an embodiment of the present invention.

FIG. 14 is a schematic view illustrating a wireless communication method in an HEW according to an embodiment of the present invention.

Referring to FIG. 14, in the HEW, retransmission of a PPDU based on a hybrid automatic retransmit request (HARQ) may be supported.

To support HARQ-based retransmission, there may be needed identification information on whether a PPDU transmitted by an STA is a previously transmitted PPDU or new PPDU, information on the number of retransmissions, or the like.

For example, when an AP 1400 retransmits a PPDU to an STA 1450, the AP may transmit retransmission indication information for indicating that the transmitted PPDU is a previously transmitted PPDU via the PPDU.

Table 9 blow illustrates an example of an HEW-SIG field which transmits retransmission related information.

TABLE 9

|  | Allocated bits | Field | Number of bits | Description |
|---|---|---|---|---|
| HEW-SIG | xx | Retransmission indicator | aa | Set to 0 for new PPDU<br>Set to 1 for retransmitted PPDU |

The information in Table 9 is an illustrative example, and the HEW-SIG may include other pieces of information for supporting retransmission of an STA.

The pieces of information illustrated in FIGS. 9 to 14 may be included in other fields for supporting the HEW, instead of the HEW-SIG. The pieces of information illustrated in FIGS. 9 to 14 may be combined variously and included in the HEW-SIG. In addition, the HEW-SIG may include not only the pieces of information illustrated in FIGS. 9 to 14 but also various pieces of information for supporting the HEW.

Figure 15:
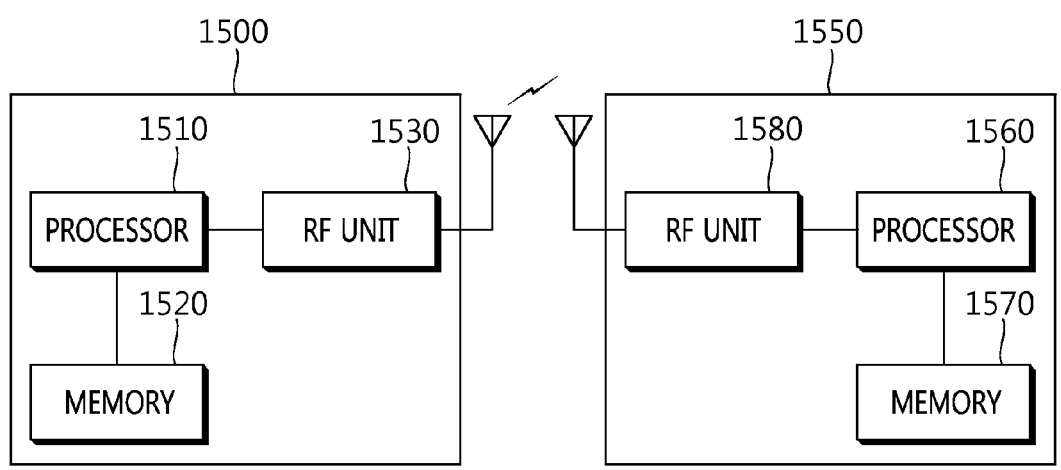
FIG. 15 is a block diagram illustrating a wireless device according to an embodiment of the present invention.

FIG. 15 is a block diagram illustrating a wireless device to which an embodiment of the present invention may apply.

Referring to FIG. 15, the wireless device may be an STA that may implement the above-described embodiments, and the wireless device may be an AP (1500) or a non-AP STA (station) (1550).

The AP 1500 includes a processor 1510, a memory 1520, and an RF (Radio Frequency) unit 1530.

The RF unit 1530 may be connected with the processor 1520 to transmit/receive radio signals.

The processor 1510 implements functions, processes, and/or methods as proposed herein. For example, the processor 1510 may be implemented to perform the operation of the above-described wireless device according to an embodiment disclosed in FIG. 9 to FIG. 14 of the present invention.

For example, the processor 1510 may use different constellations for modulating data transmitted in a plurality of OFDM symbols in transmitting a signal field through the plurality of OFDM symbols.

The STA 1550 includes a processor 1560, a memory 1570, and an RF (Radio Frequency) unit 1580.

The RF unit 1580 may be connected with the processor 1560 to transmit/receive radio signals.

The processor 1560 implements functions, processes, and/or methods as proposed herein. For example, the processor 1560 may be implemented to perform the operation of the above-described wireless device according to an embodiment disclosed in FIG. 9 to FIG. 14 of the present invention.

For example, the processor 1560 may distinguish a PPDU based on a constellation used in a signal field transmitted through a plurality of OFDM symbols.

The processor 1510, 1560 may include an ASIC (Application-Specific Integrated Circuit), other chipset, a logic circuit, a data processing device, and/or a converter that performs conversion between a baseband signal and a radio signal. The memory 1520, 1570 may include a ROM (Read-Only Memory), a RAM (Random Access Memory), a flash memory, a memory card, a storage medium, and/or other storage device. The RF unit 1530, 1580 may include one or more antennas that transmit and/or receive radio signals.

When an embodiment is implemented in software, the above-described schemes may be embodied in modules (processes, or functions, etc.) performing the above-described functions. The modules may be stored in the memory 1520, 1570 and may be executed by the processor 1510, 1560. The memory 1520, 1570 may be positioned in or outside the processor 1510, 1560 and may be connected with the processor 1510, 1560 via various well-known means.

What is claimed is:

1. A method for transmitting a signal field in a wireless local area network (WLAN), the method comprising:
   generating, by a first STA,
      a legacy signal used to transmit a legacy signal (L-SIG) field, and
      a first signal, a second signal, and a third signal, each of which used to transmit a signal (SIG) field,
   wherein the L-SIG field and the SIG field are included in a physical layer preamble of a physical layer protocol data unit (PPDU); and
   transmitting, by the first STA, the physical layer preamble including the L-SIG field and the SIG field to a second STA,
   wherein the legacy signal, the first signal, the second signal, and the third signal are respectively transmitted on a reference orthogonal frequency division multiplexing (OFDM) symbol, a first OFDM symbol, a second OFDM symbol and a third OFDM symbol,
   wherein the reference OFDM symbol is directly followed by the first OFDM symbol, which is directly followed by the second OFDM symbol, which is directly followed by the third OFDM symbol,
   wherein the SIG field indicates a time duration of a transmission opportunity (TXOP) used for the second STA,
   wherein a binary phase shift keying (BPSK) constellation is used in the reference OFDM symbol, and the first OFDM symbol, and
   wherein at least one of a second constellation used in the second OFDM symbol or a third constellation used in the third OFDM symbol is rotated relative to a first constellation used in the first OFDM symbol.

2. A station (STA) for transmitting a signal field in a wireless local area network (WLAN), the STA comprising:
   a radio frequency (RF) unit configured to transmit and receive a radio signal; and
   a processor operatively connected with the RF unit and configured to:
      generate
         a legacy signal used to transmit a legacy signal (L-SIG) field, and
         a first signal, a second signal, and a third signal, each of which are used to transmit a signal (SIG) field,
         wherein the L-SIG field and the SIG field are included in a physical layer preamble of a physical layer protocol data unit (PPDU); and
      transmit the physical layer preamble including the L-SIG field and the SIG field to a second STA,
   wherein the legacy signal, the first signal, the second signal, and the third signal are respectively transmitted on a reference orthogonal frequency division multiplexing (OFDM) symbol, a first orthogonal frequency division multiplexing OFDM symbol, a second OFDM symbol and a third OFDM symbol,
   wherein the reference OFDM symbol is directly followed by the first OFDM symbol, which is directly followed by the second OFDM symbol, which is directly followed by the third OFDM symbol,
   wherein the SIG field indicates a time duration of a transmission opportunity (TXOP) used for the second STA,
   wherein a binary phase shift keying (BPSK) constellation is used in the reference OFDM symbol, the first OFDM symbol, and
   wherein at least one of a second constellation used in the second OFDM symbol or a third constellation used in the third OFDM symbol is rotated based on a first constellation used in the first OFDM symbol.

3. The method of claim 1, wherein the SIG field is directly followed by a short training field (STF), which is directly followed by a long training (LTF).

4. The method of claim 1, wherein the SIG field further indicates a bandwidth used for the PPDU.

5. The STA of claim 2, wherein the SIG field is directly followed by a short training field (STF), which is directly followed by a long training (LTF).

6. The STA of claim 2, wherein the SIG field further indicates a bandwidth used for the PPDU.

* * * * *